United States Patent
Lai et al.

(10) Patent No.: US 11,489,744 B2
(45) Date of Patent: Nov. 1, 2022

(54) COMMUNICATION DEVICE AND METHOD FOR DYNAMICALLY ADJUSTING PACKET DETECTION THRESHOLD

(71) Applicant: Realtek Semiconductor Corp., HsinChu (TW)

(72) Inventors: Wei-Chi Lai, HsinChu (TW); Wei-Hsuan Chang, HsinChu (TW); Shen-Chung Lee, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 9 days.

(21) Appl. No.: 17/189,288

(22) Filed: Mar. 2, 2021

(65) Prior Publication Data

US 2021/0297332 A1    Sep. 23, 2021

(30) Foreign Application Priority Data

Mar. 18, 2020   (TW) .................................. 109108921

(51) Int. Cl.
*H04L 43/067* (2022.01)
*H04L 43/022* (2022.01)
*H04B 17/318* (2015.01)
*H04L 43/50* (2022.01)
*H04L 43/16* (2022.01)

(52) U.S. Cl.
CPC ......... *H04L 43/067* (2013.01); *H04B 17/318* (2015.01); *H04L 43/022* (2013.01); *H04L 43/16* (2013.01); *H04L 43/50* (2013.01)

(58) Field of Classification Search
CPC ..... H04L 43/067; H04L 43/022; H04L 43/16; H04L 43/50; H04B 17/318

USPC .......................................................... 370/329
See application file for complete search history.

(56) References Cited

U.S. PATENT DOCUMENTS

| 7,860,177 | B2 | 12/2010 | Liu | |
| 2006/0013180 | A1 | 1/2006 | Gupta | |
| 2014/0056394 | A1 | 2/2014 | Takahashi | |
| 2014/0119231 | A1* | 5/2014 | Chan | H04L 69/22 370/253 |
| 2016/0050692 | A1* | 2/2016 | Azizi | H04W 74/0816 370/329 |
| 2016/0192394 | A1* | 6/2016 | Ezaki | H04W 74/0833 370/329 |

FOREIGN PATENT DOCUMENTS

| CN | 105933978 A | 9/2016 | |
| EP | 1107628 A2 * | 6/2001 | ........... H04B 17/318 |
| JP | 2020108131 A * | 7/2020 | ............ H04W 12/03 |

* cited by examiner

*Primary Examiner* — Rownak Islam
(74) *Attorney, Agent, or Firm* — Winston Hsu (57) ABSTRACT

A communication device includes a packet detection circuit, a decoding circuit and a threshold decision circuit. The packet detection circuit is arranged to perform packet detection according to at least one threshold to determine whether a packet is included in a received signal. The decoding circuit is arranged to decode the packet when packet detection circuit determines that the packet is included in the received signal, and determine whether the packet is a predetermined packet. The threshold decision circuit is arranged to calculate a number of the predetermined packet received within a time period and adjust the at least one threshold according to the number of the predetermined packet.

18 Claims, 5 Drawing Sheets

COMMUNICATION DEVICE AND METHOD FOR DYNAMICALLY ADJUSTING PACKET DETECTION THRESHOLD

BACKGROUND OF THE INVENTION

1. Field of the Invention

The invention relates to methods for dynamically adjusting at least one packet detection threshold for a communication device, more particular to the packet detection threshold adjusting methods which are capable of effectively improving the sensitivity and accuracy of packet detection in a noisy environment.

2. Description of the Prior Art

In the Wireless Local Access Network (WLAN), the Access Point (AP) broadcasts its Service Set Identifier (SSID) by sending the Beacon packet, so as to inform the devices (or, Stations) within its coverage of existence of this AP. In this manner, when a device enters an area, the device knows whether there is any AP exists in this area by scanning the Beacon packet. Besides the SSID, the Beacon packet also carries information regarding the transmission speed supported by the AP, the MCA address of the AP, and so on. Therefore, the device can communicate with the AP by using this information.

Generally, the device may keep detecting signal energy by using the corresponding packet detection technology and determine whether the received signal is a beacon packet transmitted by an AP. However, in a noisy environment, the signals send by different APs or devices may also affect the reception of the Beacon packet. For a device, when reception performance of the Beacon packet sent by a specific AP is poor, or the device cannot receive the Beacon packets sent by the specific AP, the device has to perform a scanning operation to scan the signal energy in the environment. As a result, the transmission throughput of this device may drop, and the drop in throughput may further cause some serious problems such as disconnection between the device and the AP.

In view of this, a method for dynamically adjusting at least one packet detection threshold is required. By dynamically adjusting the threshold utilized in packet detection, the packet detection sensitivity and accuracy can be adaptively adjusted according to the environment condition. In this manner, the communication device can accurately detect the Beacon packet even when it is in a noisy environment.

SUMMARY OF THE INVENTION

It is an objective of the invention to provide methods for dynamically adjusting packet detection threshold, so as to solve the problem of poor reception performance when the communication device is in a noisy environment.

According to an embodiment of the invention, a communication device comprises a packet detection circuit, a decoding circuit and a threshold decision circuit. The packet detection circuit is arranged to perform packet detection according to at least one threshold to determine whether a packet is included in a received signal. The decoding circuit is arranged to decode the packet when the packet detection circuit determines that the packet is included in the received signal, and determine whether the packet is a predetermined packet. The threshold decision circuit is arranged to calculate a number of the predetermined packet received within a time period and adjust the at least one threshold according to the number of the predetermined packet.

According to an embodiment of the invention, a method for dynamically adjusting at least one threshold utilized by a communication device for performing packet detection comprises: performing packet detection according to the at least one threshold to determine whether a packet is included in a received signal; when determining that a packet is included in the received signal, decoding the packet to determine whether the packet is a predetermined packet and obtain a determination result; calculating a number of the predetermined packet received within a time period according to the determination results obtained within the time period; and adjusting the at least one threshold according to the number of the predetermined packet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
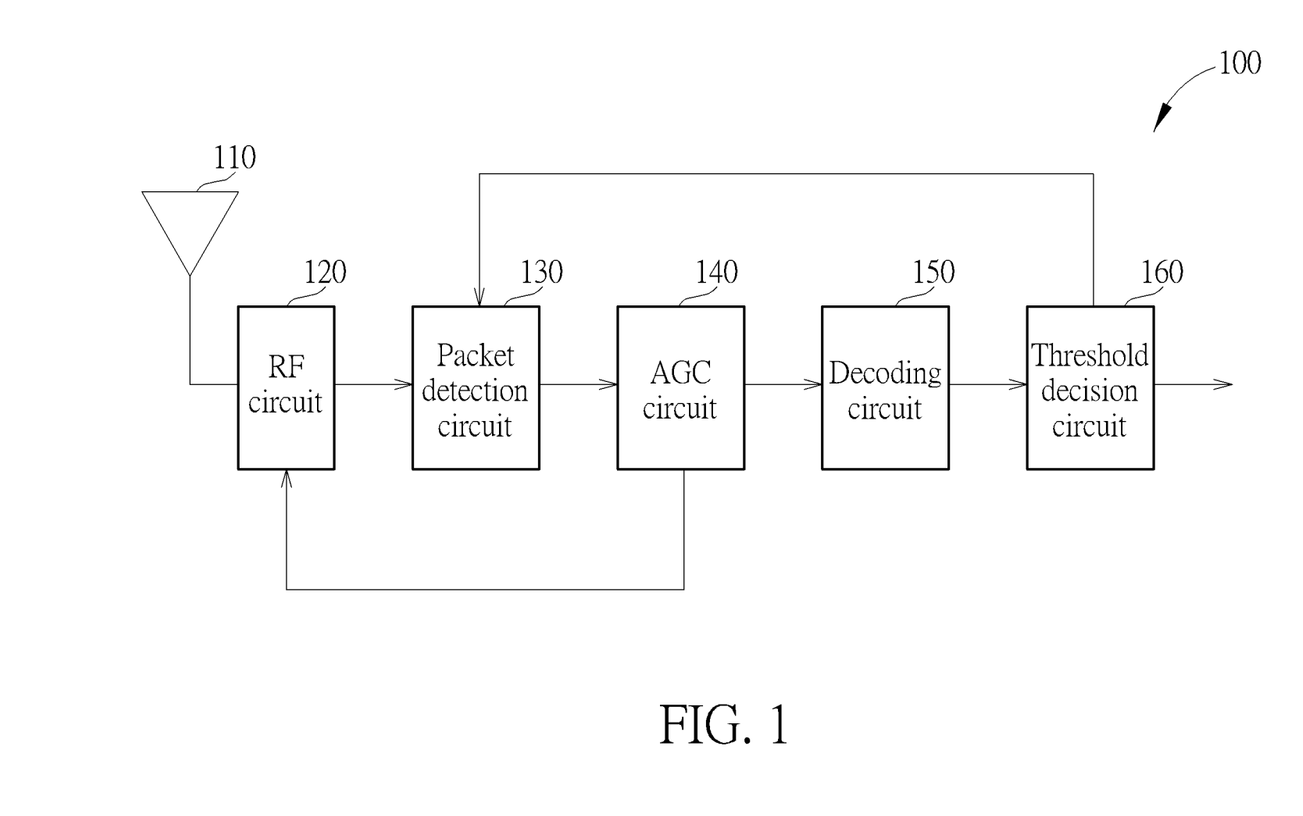
FIG. 1 shows an exemplary block diagram of a communication device according to an embodiment of the invention.

FIG. 1 shows an exemplary block diagram of a communication device according to an embodiment of the invention. It should be noted that, in order to clarify the concept of the invention, FIG. 1 presents a simplified block diagram in which only the components relevant to the invention are shown. As will be readily appreciated by a person of ordinary skill in the art, a communication device may further comprise some other components not shown in FIG. 1, so as to implement the functionalities of wireless communication and related signal processing.

The communication device 100 may at least comprise an antenna 110, a radio frequency (RF) circuit 120, a packet detection circuit 130, an Automatic Gain Control (AGC) circuit 140, a decoding circuit 150 and a threshold decision circuit 160. The RF circuit 120 is arranged to transmit and/or receive wireless RF signals via the antenna 110, and further arranged to process the RF signals to be transmitted and/or the received RF signals. The packet detection circuit 130 is a detection circuit arranged to perform packet detection according to at least one threshold to determine whether a packet is included in a received signal. The packet detection circuit 130 may keep performing packet detection on the received signals and keep generating the corresponding packet detection results. The AGC circuit 140 is arranged to control the gain of an amplifier (not shown in FIG. 1) configured inside of the RF circuit 120. For example, the AGC circuit 140 may adjust the gain of the amplifier according to the packet detection result generated by the packet detection circuit 130 and/or the Received Signal Strength Indication (RSSI) of the received signal.

The decoding circuit 150 is arranged to further decode the packet when the packet detection circuit 130 determines that a packet is included in the received signal, so as to determine the content of the packet and obtain a determination result accordingly. For example, the decoding circuit 150 may decode the packet to determine whether the packet is a predetermined packet, determine whether the packet is a packet that is supposed to be transmitted to the communication device 100, and determine the content carried in the packet. The threshold decision circuit 160 is arranged to calculate a number of the predetermined packet received within a time period according to the determination results obtained from the decoding circuit 150 within the time period and adjust the aforementioned at least one threshold according to the number of the predetermined packet.

Figure 2:
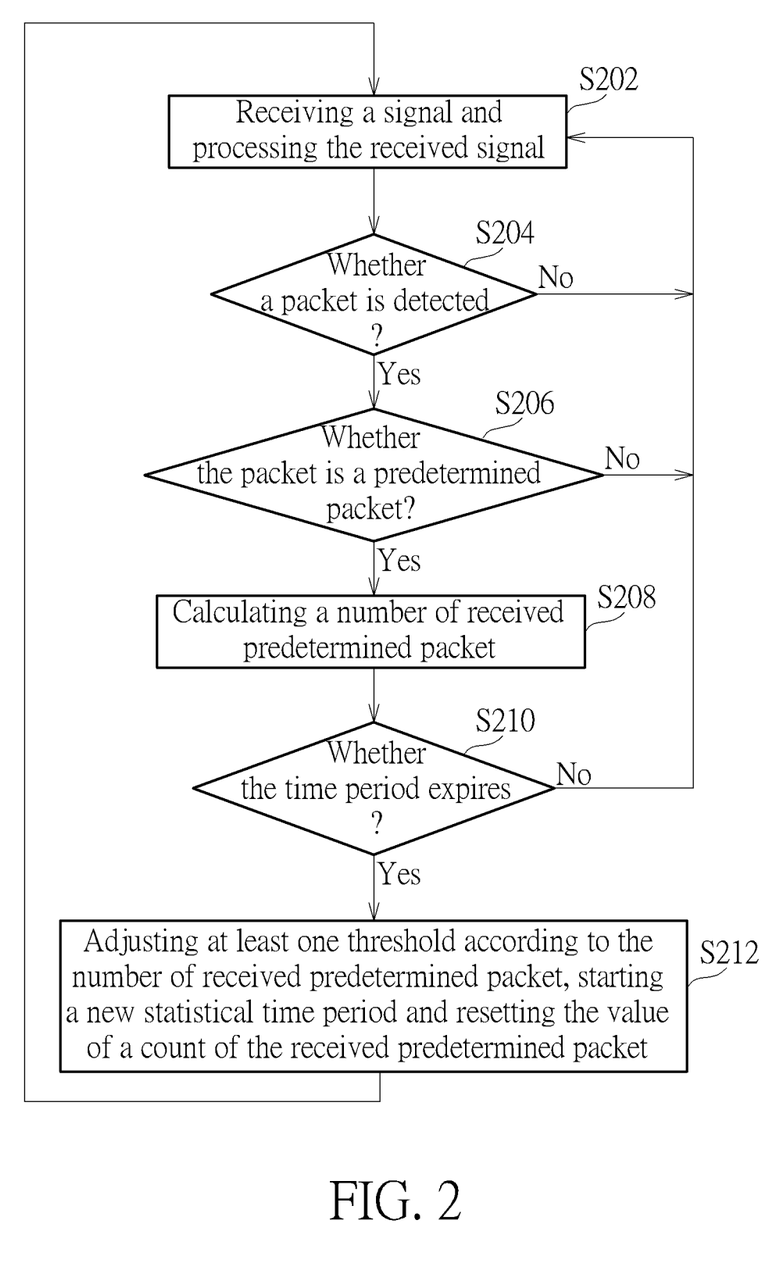
FIG. 2 shows a flow chart of a method for dynamically adjusting the threshold utilized in packet detection according to an embodiment of the invention.

FIG. 2 shows a flow chart of a method for dynamically adjusting the threshold utilized in packet detection according to an embodiment of the invention.

Step S202: Receiving, by the RF circuit 120, a signal via the antenna 110 and processing the received signal by the RF circuit 120.

Step S204: Performing, by the packet detection circuit 130, packet detection according to at least one threshold to determine whether a packet is included in the received signal. According to an embodiment of the invention, the packet detection circuit 130 may use a match filter to calculate the cross correlation between the received signal and a predetermined signal sequence (for example, the Barker code) and obtain a calculation result, and determine whether the calculation result is greater than a cross correlation threshold. If yes, a first flag is set. In addition, the packet detection circuit 130 may further measure the energy (or power) of the received signal within a time period of two consecutive symbols and obtain an energy statistic result, and determine whether the energy statistic result is greater than an energy threshold. If yes, a second flag is set. After the aforementioned operations, the packet detection circuit 130 is arranged to determine whether the first flag and the second flag are both set. If yes, the packet detection circuit 130 determines that a packet is included in the received signal (that is, a packet is detected by the packet detection circuit 130), and step S206 is entered. If no, the packet detection circuit 130 determines that no packet is included in the received signal (that is, no packet is detected by the packet detection circuit 130), and step S202 is returned. In another embodiment of the invention, the packet detection circuit 130 is arranged to determine whether a packet is included in the received signal by determining whether at least one of the first flag and the second flag is set.

Step S206: Decoding, by the decoding circuit 150, the packet detected by the packet detection circuit 130 to determine whether the packet is a predetermined packet. If yes, step S208 is entered. If no, step S202 is returned. According to an embodiment of the invention, the predetermined packet is a broadcast packet. According to another embodiment of the invention, the predetermined packet is a packet periodically transmitted by a specific device (for example, an AP which keeps in communication with the communication device 100, or an AP that the communication device 100 wants to communicate with). For example, the predetermined packet may be a Beacon packet periodically transmitted by the specific device. The decoding circuit 150 may determine whether the packet is a packet periodically transmitted by a specific device according to the content of the header of this packet.

According to an embodiment of the invention, the predetermined packet may be the packet (such as the Beacon packet) modulated based on Complementary Code Keying (CCK) modulation scheme, the packet (such as the Beacon packet) modulated based on Orthogonal Frequency Division Multiplexing (OFDM) modulation scheme, or the packet modulated based on other modulation schemes that comply with the Institute of Electrical and Electronics Engineers (IEEE) 802.11 specifications. It should be noted that the aforementioned threshold value utilized in packet detection may be accordingly adjusted or set based on the modulation scheme of the predetermined packet to be detected.

Step S208: Calculating, by the threshold decision circuit 160, a number of the predetermined packet received by the communication device 100 within a time period according to the determination results obtained in step S206 within the time period. For example, when starting a new statistical time period, the threshold decision circuit 160 may set an initial value of a count to 0, and the threshold decision circuit 160 may use this count to accumulate the number of received predetermined packets. Every time when step S208 is entered, the threshold decision circuit 160 may add 1 to the value of this count.

Step S210: Determining, by the threshold decision circuit 160, whether the time period expires. For example, the time period utilized to calculate the number of received predetermined packets may be set to 2 seconds. The threshold decision circuit 160 may determine whether the time period expires according to a system clock. If yes, step S212 is entered. If no, step S202 is returned.

Step S212: Adjusting, by the threshold decision circuit 160, at least one threshold according to the value of this count (that is, the number of received predetermined packets). The adjusted threshold is provided to the packet detection circuit 130 for performing subsequent packet detection, and before returning to step S212, a new statistical time period is started and the value of this count is reset. In the embodiment of the invention, the threshold decision circuit 160 may adjust at least one of the aforementioned cross correlation threshold and energy threshold according to the number of received predetermined packets. It should be noted that the aforementioned cross correlation threshold and energy threshold are merely one of a variety of implementations, and the invention should not be limited thereto. In the embodiments of the invention, the threshold decision circuit 160 may adjust any threshold utilized in packet detection according to the number of received predetermined packets.

Figure 3:
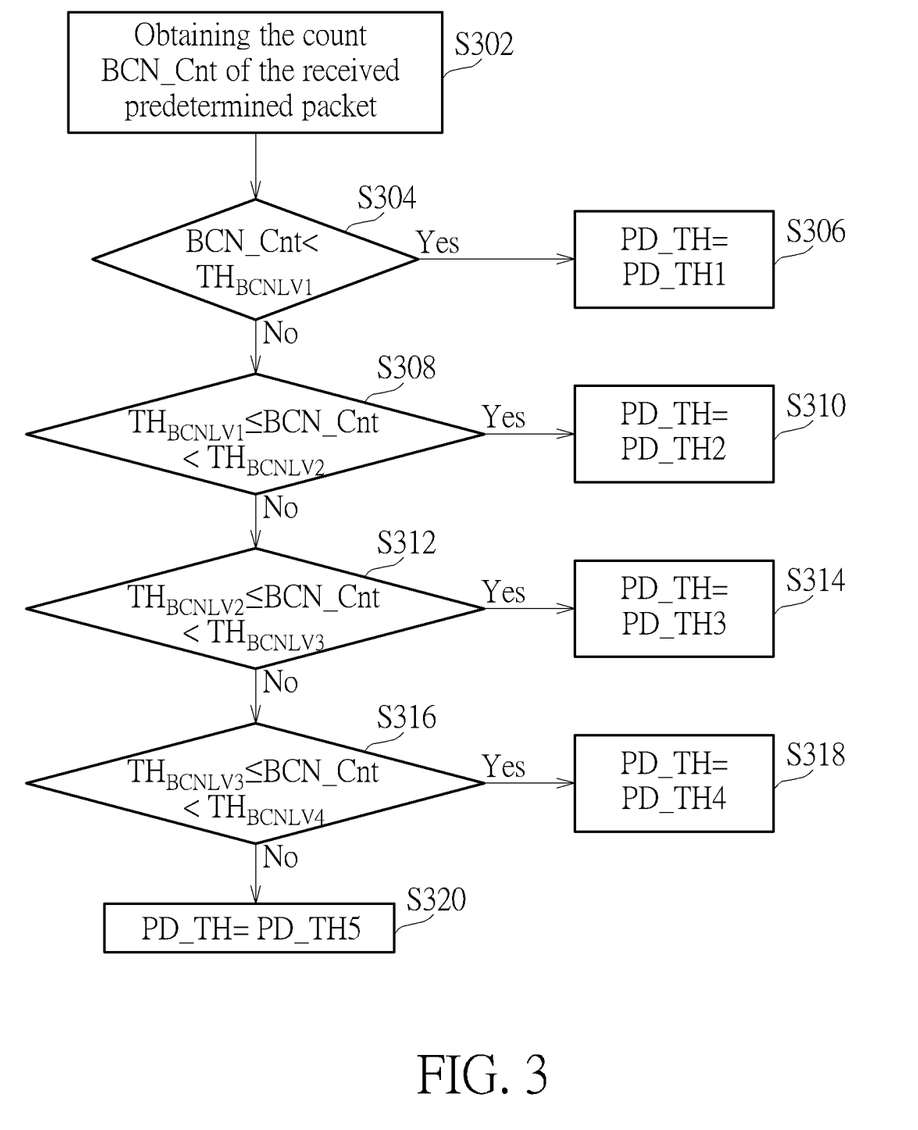
FIG. 3 is a flow chart of a method for adjusting/determining value of a threshold according to a first embodiment of the invention.

FIG. 3 is a flow chart of a method for adjusting/determining the value of a threshold according to a first embodiment of the invention. In the first embodiment of the invention, the threshold decision circuit 160 may adjust or set the value of at least one threshold utilized in packet detection according to the number of received predetermined packets.

Step S302: Calculating, by the threshold decision circuit 160, the number of the predetermined packet received within a time period to obtain a count BCN_Cnt, which may be a statistic result of the number of the predetermined packet received within the time period.

Step S304: Determining, by the threshold decision circuit 160, whether the count BCN_Cnt is smaller than a first count threshold $TH_{BCNLV1}$. If yes, step S306 is entered. If no, step S308 is entered.

Step S306: Setting, by the threshold decision circuit 160, the value of at least one threshold PD_TH utilized in packet detection to the predetermined level PD_TH1.

Step S308: Determining, by the threshold decision circuit 160, whether the count BCN_Cnt is greater than or equal to the first count threshold $TH_{BCNLV1}$ and smaller than a second count threshold $TH_{BCNLV2}$. If yes, step S310 is entered. If no, step S312 is entered.

Step S310: Setting, by the threshold decision circuit 160, the value of at least one threshold PD_TH utilized in packet detection to the predetermined level PD_TH2.

Step S312: Determining, by the threshold decision circuit 160, whether the count BCN_Cnt is greater than or equal to the second count threshold $TH_{BCNLV2}$ and smaller than a third count threshold $TH_{BCNLV3}$. If yes, step S314 is entered. If no, step S316 is entered.

Step S314: Setting, by the threshold decision circuit 160, the value of at least one threshold PD_TH utilized in packet detection to the predetermined level PD_TH3.

Step S316: Determining, by the threshold decision circuit 160, whether the count BCN_Cnt is greater than or equal to the third count threshold $TH_{BCNLV3}$ and smaller than a fourth count threshold $TH_{BCNLV4}$. If yes, step S318 is entered. If no, step S320 is entered.

Step S318: Setting, by the threshold decision circuit 160, the value of at least one threshold PD_TH utilized in packet detection to the predetermined level PD_TH4.

Step S320: Setting, by the threshold decision circuit 160, the value of at least one threshold PD_TH utilized in packet detection to the predetermined level PD_TH5.

It should be noted that although in the aforementioned embodiments, the threshold decision circuit 160 determines to set the value of the at least one threshold PD_TH to which of the five predetermined levels PD_TH1~PD_TH5 based on four count thresholds $TH_{BCNLV1}$~$TH_{BCNLV4}$, the invention should not be limited thereto. In the embodiments of the invention, the number of predetermined levels and the number of count thresholds may be flexibly selected or designed based on system requirements. In addition, the values of the predetermined levels PD_TH1~PD_TH5 may also be flexibly selected or designed based on system requirements.

According to an embodiment of the invention, by repeatedly performing the steps shown in the flow chart in FIG. 3, the packet detection threshold PD_TH may be adjusted or set accordingly as the count BCN_Cnt of the predetermined packet changes. For example, when the communication device 100 determines that the number of received predetermined packets decreases, it means that the current communication environment is hard for the communication device 100 to detect or receive the predetermined packet. Therefore, the threshold decision circuit 160 may determine to decrease the value of the packet detection threshold PD_TH, so as to increase the probability of detecting the predetermined packet. On the other hand, when the communication device 100 determines that the number of received predetermined packets increases, the threshold decision circuit 160 may determine to increase the value of the packet detection threshold PD_TH, so as to improve the overall signal processing performance.

To be more specific, according to an embodiment of the invention, when the threshold decision circuit 160 determines that the number of received predetermined packets obtained in the current statistic time period is fewer than the number of received predetermined packets obtained in a previous statistic time period, the threshold decision circuit 160 may determine to decrease the packet detection threshold PD_TH. When the threshold decision circuit 160 determines that the number of received predetermined packets obtained in the current statistic time period is more than the number of received predetermined packets obtained in a previous statistic time period, the threshold decision circuit 160 may determine to increase the packet detection threshold PD_TH.

Figure 4:
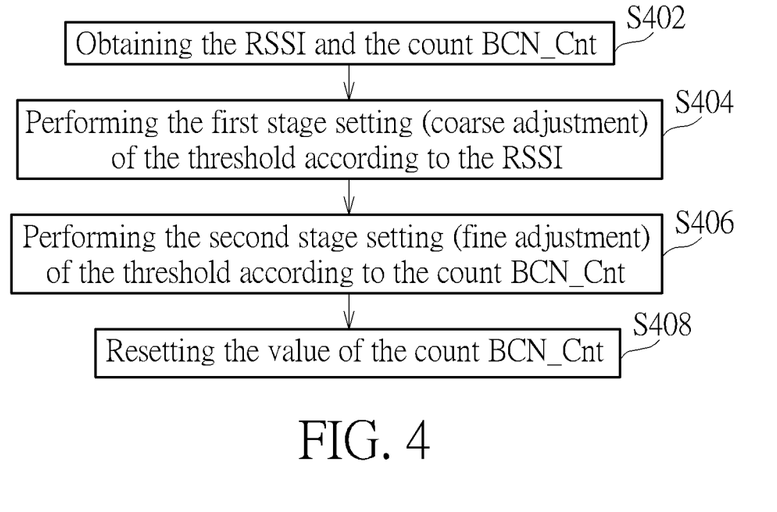
FIG. 4 is a flow chart of a method for adjusting/determining the value of a threshold according to a second embodiment of the invention.

FIG. 4 is a flow chart of a method for adjusting/determining the value of a threshold according to a second embodiment of the invention. In the second embodiment of the invention, the threshold decision circuit 160 may further obtain the RSSI of the received signal and adjust or set the value of at least one threshold utilized in packet detection according to the number of received predetermined packets and the RSSI. In the second embodiment of the invention, the adjustment of the value of the packet detection threshold may be stepwise. For example, the threshold decision circuit 160 may initially set (coarsely adjust) the value of the packet detection threshold according to the RSSI, then set (finely adjust) the value of the packet detection threshold more precisely according to the number of received predetermined packets.

Step S402: Calculating, by the threshold decision circuit 160, the number of the predetermined packet received within a time period to obtain a count BCN_Cnt. In addition, the threshold decision circuit 160 may further obtain the RSSI of the received signal. For example, the packet detection circuit 130 may calculate the RSSI of the received signal according to the aforementioned energy statistic result, where the RSSI may be an average, a medium, the maximum or the minimum of the RSSIs of the signals received within a time period, or a value calculated based on any of the average, the medium, the maximum or the minimum of the RSSIs, or any measured energy. The threshold decision circuit 160 may obtain information regarding the RSSI from the packet detection circuit 130.

Step S404: Performing, by the threshold decision circuit 160, a first stage setting (coarse adjustment) of the threshold according to the RSSI. For example, the threshold decision circuit 160 may determine a first setting value according to the RSSI.

Step S406: Performing, by the threshold decision circuit 160, a second stage setting (fine adjustment) of the threshold according to the count BCN_Cnt. For example, the threshold decision circuit 160 may determine a second setting value according to the value of the count BCN_Cnt, and determine the value of the packet detection threshold PD_TH according to a summation of the first setting value and the second setting value.

Step S408: Providing, by the threshold decision circuit 160, the adjusted packet detection threshold PD_TH to the packet detection circuit 130 for performing subsequent packet detection, and resetting the value of the count BCN_Cnt as in step S212 for recalculating the number of received predetermined packet in a new statistical time period.

Figure 5:
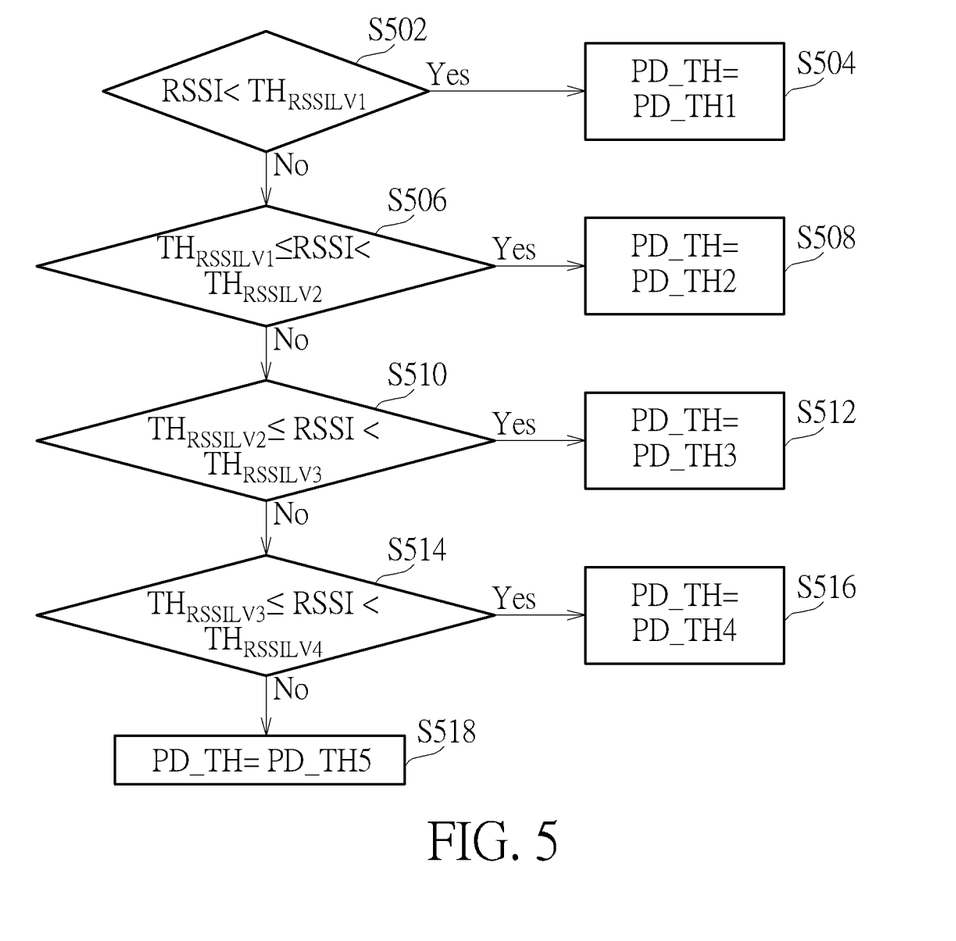
FIG. 5 is a detailed flow chart of performing the first stage setting of the threshold according to the second embodiment of the invention.

FIG. 5 is a detailed flow chart of performing the first stage setting of the threshold (e.g. the aforementioned step S404) according to the second embodiment of the invention.

Step S502: Determining, by the threshold decision circuit 160, whether the RSSI is smaller than a first RSSI threshold $TH_{RSSILV1}$. If yes, step S504 is entered. If no, step S506 is entered.

Step S504: Setting, by the threshold decision circuit 160, the value of at least one threshold PD_TH utilized in packet detection to the predetermined level PD_TH1.

Step S506: Determining, by the threshold decision circuit 160, whether the RSSI is greater than or equal to the first RSSI threshold $TH_{RSSILV1}$ and smaller than a second RSSI threshold $TH_{RSSILV2}$. If yes, step S508 is entered. If no, step S510 is entered.

Step S508: Setting, by the threshold decision circuit 160, the value of at least one threshold PD_TH utilized in packet detection to the predetermined level PD_TH2.

Step S510: Determining, by the threshold decision circuit 160, whether the RSSI is greater than or equal to the second RSSI threshold $TH_{RSSILV2}$ and smaller than a third RSSI threshold $TH_{RSSILV3}$. If yes, step S512 is entered. If no, step S514 is entered.

Step S512: Setting, by the threshold decision circuit 160, the value of at least one threshold PD_TH utilized in packet detection to the predetermined level PD_TH3.

Step S514: Determining, by the threshold decision circuit 160, whether the RSSI is greater than or equal to the third RSSI threshold $TH_{RSSILV3}$ and smaller than a fourth RSSI threshold $TH_{RSSILV4}$. If yes, step S516 is entered. If no, step S518 is entered.

Step S516: Setting, by the threshold decision circuit 160, the value of at least one threshold PD_TH utilized in packet detection to the predetermined level PD_TH4.

Step S518: Setting, by the threshold decision circuit 160, the value of at least one threshold PD_TH utilized in packet detection to the predetermined level PD_TH5.

It should be noted that although in the aforementioned embodiments, the threshold decision circuit 160 determines to set the value of the at least one threshold PD_TH to which of the five predetermined levels PD_TH1~PD_TH5 based on four RSSI thresholds $TH_{RSSILV1}$~$TH_{RSSILV4}$, the invention should not be limited thereto. In the embodiments of the invention, the number of predetermined levels and the number of RSSI thresholds may be flexibly selected or designed based on system requirements. In addition, the values of the predetermined levels PD_TH1~PD_TH5 may also be flexibly selected or designed based on system requirements.

Figure 6:
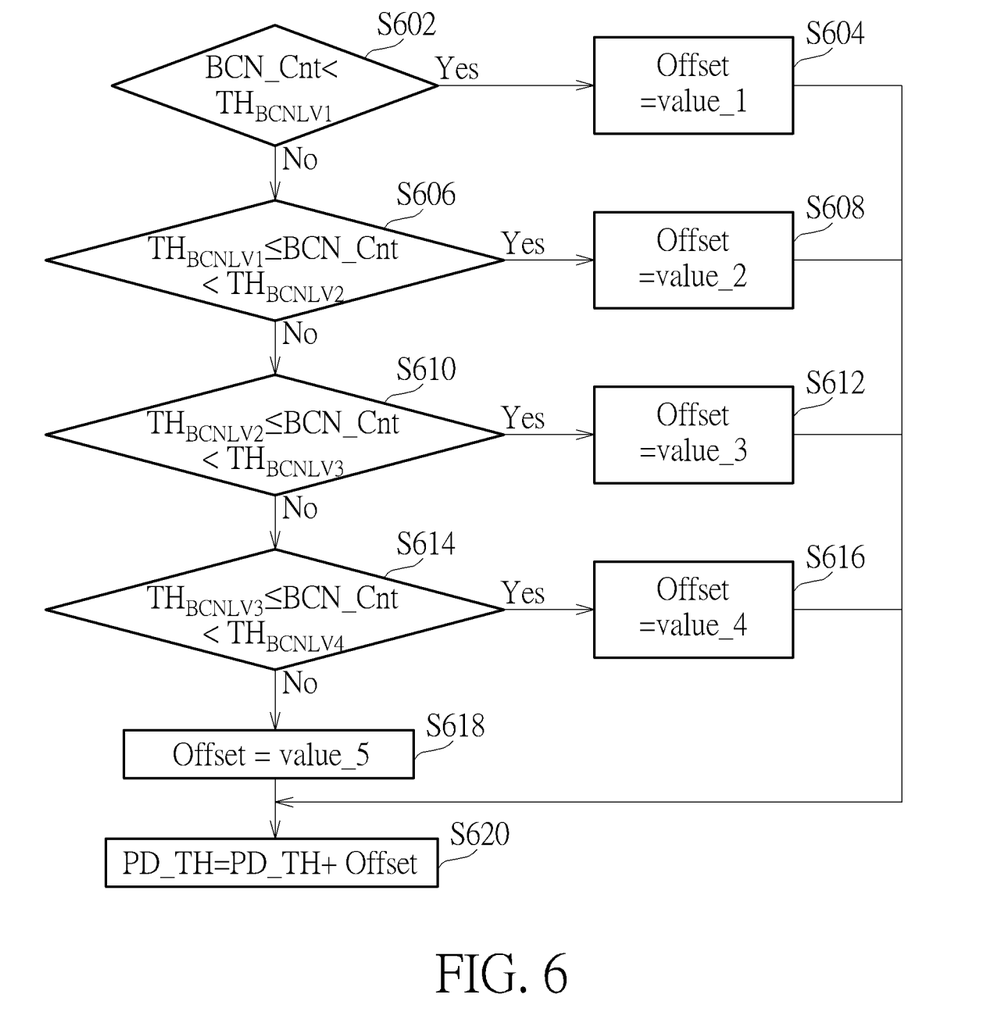
FIG. 6 is a detailed flow chart of performing the second stage setting of the threshold according to the second embodiment of the invention.

FIG. 6 is a detailed flow chart of performing the second stage setting of the threshold (e.g. the aforementioned step S406) according to the second embodiment of the invention.

Step S602: Determining, by the threshold decision circuit 160, whether the count BCN_Cnt is smaller than a first count threshold $TH_{BCNLV1}$. If yes, step S604 is entered. If no, step S606 is entered.

Step S604: Setting, by the threshold decision circuit 160, the offset of at least one threshold PD_TH utilized in packet detection as Offset=value_1.

Step S606: Determining, by the threshold decision circuit 160, whether the count BCN_Cnt is greater than or equal to the first count threshold $TH_{BCNLV1}$ and smaller than a second count threshold $TH_{BCNLV2}$. If yes, step S608 is entered. If no, step S610 is entered.

Step S608: Setting, by the threshold decision circuit 160, the offset of at least one threshold PD_TH utilized in packet detection as Offset=value_2.

Step S610: Determining, by the threshold decision circuit 160, whether the count BCN_Cnt is greater than or equal to the second count threshold $TH_{BCNLV2}$ and smaller than a third count threshold $TH_{BCNLV3}$. If yes, step S612 is entered. If no, step S614 is entered.

Step S612: Setting, by the threshold decision circuit 160, the offset of at least one threshold PD_TH utilized in packet detection as Offset=value_3.

Step S614: Determining, by the threshold decision circuit 160, whether the count BCN_Cnt is greater than or equal to the third count threshold $TH_{BCNLV3}$ and smaller than a fourth count threshold $TH_{BCNLV4}$. If yes, step S616 is entered. If no, step S618 is entered.

Step S616: Setting, by the threshold decision circuit 160, the offset of at least one threshold PD_TH utilized in packet detection as Offset=value_4.

Step S618: Setting, by the threshold decision circuit 160, the offset of at least one threshold PD_TH utilized in packet detection as Offset=value_5.

Step S620: Setting, by the threshold decision circuit 160, the threshold PD_TH according to the obtained fine adjustment (i.e. the value of the offset, or the second setting value) and the coarse adjustment (i.e. the first setting value) obtained in step S404. That is, setting PD_TH=PD_TH+Offset.

It should be noted that although in the aforementioned embodiments, the threshold decision circuit 160 determines to set the offset of the at least one threshold PD_TH to which of the five predetermined values value_1~value_5 based on four count thresholds $TH_{BCNLV1}$~$TH_{BCNLV4}$, the invention should not be limited thereto. In the embodiments of the invention, the number of predetermined values and the number of count thresholds may be flexibly selected or designed based on system requirements.

According to an embodiment of the invention, by repeatedly performing the steps shown in the flow chart in FIG. 4, the packet detection threshold PD_TH may be adjusted or set accordingly as the RSSI and/or the count BCN_Cnt of the predetermined packet change. The amount of threshold adjustment based on RSSI may be greater than the amount of threshold adjustment based the count BCN_Cnt. For example, the amount of adjustment of the first setting value in step S404 may be 1 (as an example, in FIG. 5, PD_TH1=5, PD_TH2=6, and the rest may be deduced by analogy), and the amount of adjustment of the second setting value in step S406 may be 0.5 or 0.1 (as an example, in FIG. 6, value_1=0.5, value_2=0.6, and the rest may be deduced by analogy).

In addition, according to an embodiment of the invention, when the communication device 100 determines that the number of received predetermined packets decreases, it means that the current communication environment is hard for the communication device 100 to detect or receive the predetermined packet. Therefore, the threshold decision circuit 160 may determine to decrease the value of the packet detection threshold PD_TH by decreasing the amount of fine adjustment (the second setting value), so as to increase the probability of detecting the predetermined packet. On the other hand, when the communication device 100 determines that the number of received predetermined packets increases, the threshold decision circuit 160 may determine to increase the value of the packet detection threshold PD_TH by increasing the amount of fine adjustment (the second setting value), so as to improve the overall signal processing performance.

To be more specific, according to an embodiment of the invention, when the threshold decision circuit 160 determines that the number of received predetermined packets obtained in the current statistic time period is fewer than the number of received predetermined packets obtained in a previous statistic time period, the threshold decision circuit 160 may determine to decrease the packet detection threshold PD_TH. When the threshold decision circuit 160 determines that the number of received predetermined packets obtained in the current statistic time period is more than the number of received predetermined packets obtained in a previous statistic time period, the threshold decision circuit 160 may determine to increase the packet detection threshold PD_TH.

Similarly, when the threshold decision circuit 160 determines that the RSSI decreases, the threshold decision circuit 160 may determine to decrease the packet detection threshold PD_TH by decreasing the first setting value, so as to increase the probability of detecting the predetermined packet. On the other hand, when the communication device 100 determines that the RSSI increases, the threshold decision circuit 160 may determine to increase the value of the packet detection threshold PD_TH by increasing the first setting value, so as to improve the overall signal processing performance.

According to a third embodiment of the invention, the threshold decision circuit 160 may further obtain a false alarm probability or a false alarm rate regarding the packet detection, and adjust or set the value of at least one threshold utilized in packet detection according to the number of received predetermined packets and the false alarm probability. Every time when the decoding circuit 150 determines that the packet is not a packet that is supposed to be transmitted to the communication device 100 after decoding the packet, the value of a false alarm count may be increased by 1. The aforementioned false alarm probability may be obtained according to the value of the false alarm count and a value of a packet count obtained based on the number of packets detected by the packet detection circuit 130.

In the third embodiment of the invention, the adjustment of the value of the packet detection threshold may also be stepwise. For example, the threshold decision circuit 160 may initially set (coarsely adjust) the value of the packet detection threshold according to the false alarm probability as the embodiments shown in FIG. 4 and FIG. 5, then set (finely adjust) the value of the packet detection threshold more precisely according to the number of received predetermined packets as the embodiments shown in FIG. 4 and FIG. 6. In the third embodiment of the invention, the method of adjusting or setting the value of at least one threshold utilized in packet detection according to the number of received predetermined packets and the false alarm probability is similar to the method of adjusting or setting the value of at least one threshold utilized in packet detection according to the number of received predetermined packets and the RSSI as illustrated in the second embodiment of the invention, As the detailed flow charts of adjusting or setting the value of the at least one threshold in the third embodiment can be deduced from FIG. 4 and FIG. 5 by accordingly modifying the parameters (for example, the RSSI, the RSSI thresholds, the first setting value) utilized in FIG. 4 and FIG. 5, the detailed flow charts of the third embodiment are omitted here for brevity.

Similarly, according to an embodiment of the invention, by repeatedly performing the steps shown in the flow chart in FIG. 4, the packet detection threshold PD_TH may be adjusted or set accordingly as the false alarm probability and/or the count BCN_Cnt of the predetermined packet change. The amount of threshold adjustment based on false alarm probability may be greater than the amount of threshold adjustment based the count BCN_Cnt.

In addition, according to an embodiment of the invention, when the communication device 100 determines that the number of received predetermined packets decreases, it means that the current communication environment is hard for the communication device 100 to detect or receive the predetermined packet. Therefore, the threshold decision circuit 160 may determine to decrease the value of the packet detection threshold PD_TH by decreasing the amount of fine adjustment (the second setting value), so as to increase the probability of detecting the predetermined packet. On the other hand, when the communication device 100 determines that the number of received predetermined packets increases, the threshold decision circuit 160 may determine to increase the value of the packet detection threshold PD_TH by increasing the amount of fine adjustment (the second setting value), so as to improve the overall signal processing performance.

For example, when the threshold decision circuit 160 determines that the number of received predetermined packets obtained in the current statistic time period is fewer than the number of received predetermined packets obtained in a previous statistic time period, the threshold decision circuit 160 may determine to decrease the packet detection threshold PD_TH. When the threshold decision circuit 160 determines that the number of received predetermined packets obtained in the current statistic time period is more than the number of received predetermined packets obtained in a previous statistic time period, the threshold decision circuit 160 may determine to increase the packet detection threshold PD_TH.

As discussed above, the invention provides methods for dynamically adjusting the packet detection threshold. By dynamically adjusting at least one threshold utilized for performing packet detection according one or more of the RSSI, the false alarm probability, and the number of received predetermined packet, the packet detection sensitivity and accuracy can be adaptively adjusted according to the environment condition. In this manner, the communication device can accurately detect the Beacon packet even when it is in a noisy environment. It should be noted that each of the above method steps can be implemented by hardware, software or firmware according to the needs of the designer Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A communication device, comprising:
a packet detection circuit, arranged to perform packet detection according to at least one threshold to determine whether a packet is included in a received signal;
a decoding circuit, arranged to decode the packet when the packet detection circuit determines that the packet is included in the received signal, and determine whether the packet is a predetermined packet; and
a threshold decision circuit, arranged to calculate a number of the predetermined packet received within a time period,
wherein the threshold decision circuit is further arranged to determine a first setting value according to a Received Signal Strength Indication (RSSI) of the received signal, determine a second setting value according to the number of the predetermined packet received within the time period and adjust the at least one threshold according to the first setting value and the second setting value.

2. The communication device of claim 1, wherein the at least one threshold comprise at least one of a cross correlation threshold and an energy threshold.

3. The communication device of claim 1, wherein the decoding circuit decodes the packet to determine whether the packet is a packet to be transmitted to the communication device and to calculate a false alarm probability, and the threshold decision circuit is arranged to adjust the at least one threshold further according to the false alarm probability.

4. The communication device of claim 1, wherein the predetermined packet is a broadcast packet.

5. The communication device of claim 1, wherein the predetermined packet is a packet periodically transmitted by a specific device.

6. The communication device of claim 1, wherein the predetermined packet is a packet modulated based on Complementary Code Keying (CCK) modulation scheme.

7. The communication device of claim 1, wherein the predetermined packet is a packet modulated based on Orthogonal Frequency Division Multiplexing (OFDM) modulation scheme.

8. The communication device of claim 1, wherein the predetermined packet is a Beacon packet transmitted by a specific device.

9. The communication device of claim 1, wherein the threshold decision circuit is arranged to adjust the at least one threshold according to a summation of the first setting value and the second setting value.

10. A method for dynamically adjusting at least one threshold utilized by a communication device for performing packet detection, comprising:
  performing packet detection according to the at least one threshold to determine whether a packet is included in a received signal;
  when determining that a packet is included in the received signal, decoding the packet to determine whether the packet is a predetermined packet and obtain a determination result;
  calculating a number of the predetermined packet received within a time period according to the determination results obtained within the time period;
  determining a first setting value according to a Received Signal Strength Indication (RSSI) of the received signal;
  determining a second setting value according to the number of the predetermined packet received within the time period; and
  adjusting the at least one threshold according to the first setting value and the second setting value.

11. The method of claim 10, wherein the at least one threshold comprise at least one of a cross correlation threshold and an energy threshold.

12. The method of claim 10, further comprising:
  determining whether the packet is a packet to be transmitted to the communication device and calculating a false alarm probability,
  wherein in the step of adjusting the at least one threshold, the at least one threshold is adjusted further according to the false alarm probability.

13. The method of claim 10, wherein the predetermined packet is a broadcast packet.

14. The method of claim 10, wherein the predetermined packet is a packet periodically transmitted by a specific device.

15. The method of claim 10, wherein the predetermined packet is a packet modulated based on Complementary Code Keying (CCK) modulation scheme.

16. The method of claim 10, wherein the predetermined packet is a packet modulated based on Orthogonal Frequency Division Multiplexing (OFDM) modulation scheme.

17. The method of claim 10, wherein the predetermined packet is a Beacon packet transmitted by a specific device.

18. The method of claim 10, wherein the step of adjusting the at least one threshold according to the first setting value and the second setting value further comprises:
  adjusting the at least one threshold according to a summation of the first setting value and the second setting value.

* * * * *